Nov. 9, 1937.   A. FORSTER   2,098,864

SPUR GEAR

Original Filed Feb. 24, 1934

Inventor:
Albert Forster,
by William C. Linton
Attorney

Patented Nov. 9, 1937

2,098,864

UNITED STATES PATENT OFFICE 2,098,864

SPUR GEAR

Albert Forster, Milanino, Italy

Application February 24, 1934, Serial No. 712,809
Renewed April 1, 1937. In Switzerland October 2, 1933

21 Claims. (Cl. 74—466)

The invention relates to spur toothed wheels which have tooth faces being not symmetrical with regard to the centre plane of the wheel. Two congruous gears of this kind cannot generally mesh with each other, at least not with parallel axes of rotation, and it is commonly required (when teeth have parallel tracks) that right and left gears be cut, which are conjugated with one another.

The object of the invention is to provide gear wheels having teeth with such asymmetrical tooth faces and being able to mesh with each other in any relation. This object is obtained according to the invention by shaping the teeth (with inverted tracks) such that they are conjugated with themselves, so that two congruous gears are able to mesh with each other.

Hereinafter the lines of intersection between the side faces of a tooth and the pitch surface will be called the "tracks" and such toothed wheels which are able to mesh with themselves or with congruous wheels, as well as their teeth, will be called "selfconjugated". With "thickness" of a tooth it will be meant the arc of the pitch circle lying in the centre plane of the gear and comprised between both tracks of one and the same tooth.

In carrying out the invention, a selfconjugated gear having selfconjugated teeth is obtained by providing its teeth at one side face with a track of any shape and at the other side face with a track having substantially the same shape, but being inverted with regard to the track of the first mentioned face. Helical tracks are possible, and in this case the teeth have a bevelled shape, whereby the track of one side face is a right helix and that of the other face a left helix. A double helical or asymmetrical herringbone shape is also possible, and thickness of teeth varies unevenly.

According to a preferred and most useful embodiment of the invention the tracks are of cycloidal shape, the one thereof being formed by a right and the other by a left cycloidal line enveloped upon the pitch surface. The rolling circle of the cycloidal line forming one track is substantially at one side of the centre plane of the gear and the rolling circle of the other track is at the opposite side thereof. As a consequence, the points of said tracks having the maximum curvature are more close to the one lateral end of the teeth for one of said tracks and to the other lateral end for the other track, whilst the inclination of the end of one of said tracks on the corresponding lateral plane, taken in the pitch surface, is greater for one of said tracks on the one and for the other track on the other lateral plane. In this case the teeth are of composite crescent shape, having their maximum thickness more close to the one and the minimum one more close to the other lateral plane of the gear.

In any case it is possible to correct the thickness of teeth by displacing the tracks parallel to the axis of the gear. It is also possible to obtain a localized bearing of mating tooth faces, so that a small adjustability of their axes is permitted, by bending a track or both at their side ends towards the interior of teeth, e. g. by cutting them with a slightly different longitudinal curvature.

The invention will be fully understood with reference to the accompanying drawing, in which.

Figure 1:
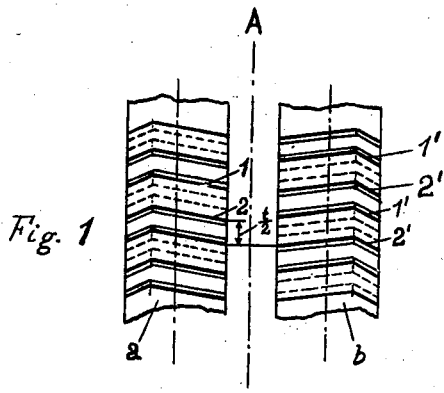
Fig. 1 is a diagrammatic view of the periphery of a pair of conjugated asymmetrical herringbone gears of known type, partially developed in a plane.

Two conjugated toothed wheels a, b of known construction (Fig. 1) having parallel tracks 1, 2; 1', 2' may be set the one at the side of the other, angularly displaced by the half of a pitch (t/2), rotated about axis A and brought in mesh with one another. From the drawing it results that the tracks 1 and 2 of the teeth of a gear are symmetrical, with regard to the centre plane A, each to the mating track 2' and 1' respectively of the teeth of the conjugated gear. It will be noted that when coming in mesh a track 1 (or 1') of a tooth always contacts with a track 2' (or 2) of another, i. e. always an outer track with an inner one and vice versa (Fig. 2). As shown in the drawing, in this case there must always be a right gear a and a left gear b meshing together.

Figure 3:
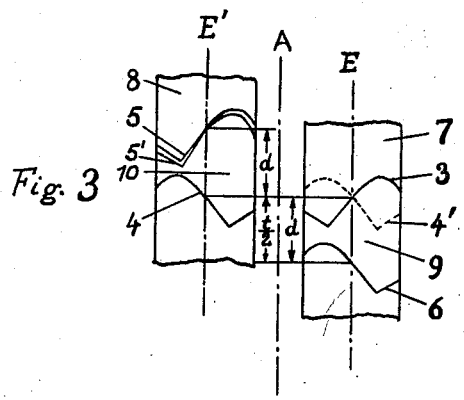
Fig. 3 is a diagram explaining broadly, developed in a plane, the genesis of the tracks of selfconjugated teeth according to the invention.

Fig. 3 explains how a selfconjugated gear according to the invention is generated: a track 3 of any shape may be brought by a half rotation about axis A to coincide with another track 4. The conjugated tracks 3, 4 which contact together when the gears are in mesh, are therefore symmetrical with regard to the axis A. A selfconjugated tooth according to the invention has on one side face a track 3 (or 4) and on the other a track 4 (or 3). As a matter of fact, it has already been stated that when two gears mesh together, an outer track (1) always comes into contact with an inner one (2') and vice versa. If, now, track 4 be transferred, on the pitch surface of gear 7, upon line 4', then it will be seen that this line is symmetrical with regard to the centre plane E of the gear, i. e. it is specular to or a mirror image of the original track 3, and if this line 4' be displaced along the pitch surface, e. g. by the distance $d$, the other track 6 of a selfconjugated tooth 9 according to the invention is obtained. Two such of tracks 3 and 6 will be hereinafter called "inverted tracks".

In a similar way, by means of a track 5 being congruous with a line which is symmetrical, with regard to the centre plane E' of the mating gear 8, to the track 4, but displaced therefrom along the pitch surface by an equal distance $d$, i. e. which is specular to, that is, a mirror image of, the track 4, another tooth 10 is obtained, which is congruous with the tooth 9. Since these teeth 9, 10 are equal, and on the other hand they are also conjugated with one another, they are so to say conjugated with themselves, or selfconjugated. The distance $d$ is considered as the mean or equivalent thickness of these irregular teeth.

In order that the gears are able to accommodate themselves to the variations in mountings and still effect a smooth running, a supplementary longitudinal curvature may be superposed to the main curvature of the tracks, so that the tracks are bent on their end portions towards the interior of teeth, as shown by line 5'. In this case a track is not congruous to a line symmetrical or specular to the other track, but somewhat differs therefrom. However, it will be still said that the tracks are inverted, since the general conformation of one of them at the right side of line E still is analogous to that of the other at the left side of the same line E. It will be said therefore that two tracks are inverted when one of them is substantially congruous with a line symmetrical or specular to the other one, or when it differs therefrom by a constant or variable curvature superposed thereto. When two tracks are inverted, an observer travelling in one sense along one of them meets with conditions of position and curvature varying according to substantially the same ratio as those he meets with when travelling along the other track in the opposite sense. In other words, if starting from one (left) side of the gear along the first track he, first, goes away from the pitch element from which he has started, he will do the same also starting from the other (right) side of the gear for the second track (although in this case he lets the said element on the other side and may-be also at different distances); if for the first track the curvature, first, increases, the curvature of the second one does the same (although in this case the curvature is always of contrary sign and may have different values), etc.

From the foregoing it results that when a tooth has inverted tracks according to the invention, one of said tracks being substantially congruous with a line symmetrical or specular to the other track with regard to the centre plane of the wheel, this tooth is selfconjugated. As a matter of fact, when two such teeth come in mesh, there are precisely the opposite tracks which come into contact, and these, being symmetric with one another, may be brought in mesh. On the other hand, it has already been shown that when a tooth of a gear is able to mesh with another, congruous tooth of another gear, both tracks touching one another are symmetrical; and since both teeth are identical, one track of each of them must be congruous with a line symmetric or specular to the other track of the same tooth. Thus a gear, in order to be selfconjugated must have inverted tracks according to the invention and conversely, if a gear has inverted tracks according to the invention, it is for this very reason selfconjugated.

Figure 4:
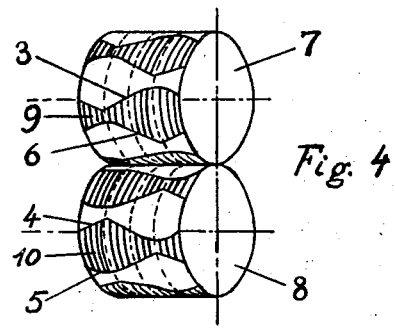
Fig. 4 is a perspective view of two pitch surfaces and selfconjugated tracks according to the invention, in meshing relation.

Fig. 4 clearly shows how such asymmetrical gears 7, 8, which are fully congruous with one another, mesh with each other. For the sake of clearness only the pitch surfaces have been represented, with the tracks 3 and 6, as well as 4 and 5, thereon; the sections of teeth 9 and 10 with the pitch surface are shaded.

Figure 5:
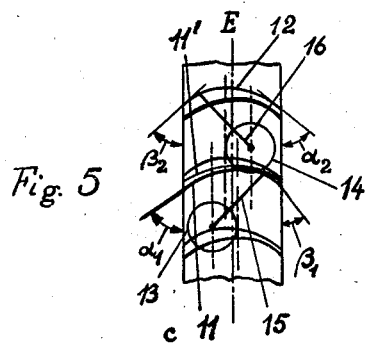
Fig. 5 is a partial diagrammatic view, developed in a plane, of the periphery of a gear according to the invention, having selfconjugated teeth with cycloidal tracks.
Figure 6:
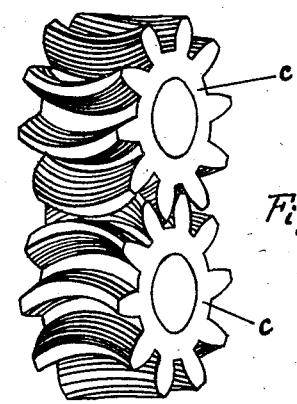
Fig. 6 is a perspective view of two selfconjugated gears with cycloidal tracks according to the invention, in meshing relation.

Figs. 5 and 6 show a preferred embodiment of the invention, wherein the tracks are longitudinally of cycloidal shape. The inner track 11 is generated by a beam 15 carried by a rolling circle 13 lying substantially at the left of the centre plane E and the outer track 12 is generated by a beam 16 carried by a rolling circle 14 lying substantially at the right of the plane E. The tracks are therefore inverted and they have a curvature varying along them. The greatest curvature of track 11 is, on Fig. 5, at the right side of the centre plane E of the gear and that of track 12 is at the left side of the same plane E. The angles comprised between the end tangents to the tracks and the lateral planes of the gear, taken on the pitch surface thereof, are unequal and inversely distributed: Angle $\alpha_1$ between track 11 and the left plane is greater than angle $\beta_1$ between the same track and the right plane, whilst angle $\alpha_2$ between track 12 and the right plane is greater than angle $\beta_2$ between the same track and the left plane.

The centres of the rolling circles 13, 14 may be at a greater or less distance from the centre plane E, according to whether a simultaneous mesh of both side ends of teeth, or a more uniform overall thickness of teeth is to be obtained. The lengths of the beams 15, 16 may be equal, or beam 15, generating the concave track, may be longer than beam 16, generating the convex track 12, so that there results a more straight track 11', and a properly localized bearing of teeth and a smooth action of gears even in the worst conditions of mounting are secured. Despite the fact that the curvature of such tracks is different, the curvature still varies along the tracks according to substantially the same ratio, since only the amount of curvature or of the variation thereof is different between both tracks. Fig. 6 shows how two identical selfconjugated gears $c$ mesh with each other.

Figure 2:
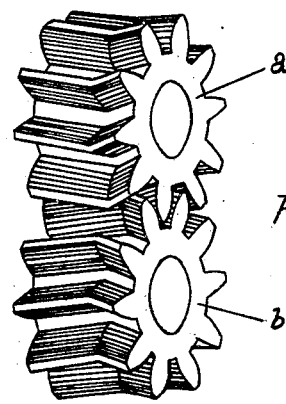
Fig. 2 is a perspective view of two mating gears according to Fig. 1.

A great advantage of selfconjugated gears according to the invention, and particularly of those having tracks of inverted cycloidal shape, consists in that only a single kind of gears ought to be cut and but fewer gears must be stocked, since a gear ($c$, Figs. 5, 6) is able to mesh with any other gear, even with an equal one, whilst with common types of asymmetric gears it is necessary to cut and keep at stock always a right and a corresponding left gear (a and b, Figs. 1, 2). Another advantage of selfconjugated gears according to the invention consists in the possibility, when using gearings comprising a plurality of gears connected in series, of varying at will the number of gears, since such gears can mesh perfectly with each other. This is not the case with gears not selfconjugated, like those illustrated in Figs. 1 and 2, and it would be necessary to keep the number of gears either even or uneven throughout all changes of them, or alternately it would be necessary to remove all of the gears between the point of insertion of a new one and one end of the gearing, and substitute them by other, different gears.

A plurality of selfconjugated indentations according to the invention, having either equal or inverted or different tracks, may be cut on the same or on separate blanks, which latter may be secured together so as to form a single piece. On this piece the various indentations may touch one another, or they may be at a greater or less distance from each other, or they may be separated by resilient or springing means of connection. Such a combination is shown on Fig. 3, whereby the means of connection have not been shown, since they are obvious and do not constitute a characteristic feature of the present invention, being already in use with the common types of gears.

The gears described and illustrated on the appended drawing are to be considered merely as examples and it is intended that the invention is capable of various embodiments, modifications and adaptations, and that this application covers any embodiments, modifications, adaptations and uses of the invention which fall within the scope of the invention and the limits of the appended claims.

I am aware that prior to my invention selfconjugated toothed wheels with teeth being symmetrical with regard to the centre plane of the wheel (straight and herringbone teeth) and also with asymmetrical different helical angle herringbone teeth and parallel tracks were known; therefore I do not claim such gears broadly, but I claim:

1. In a spur toothed wheel having a centre plane, teeth being asymmetrical with regard to said centre plane and a track on each of said teeth being, when developed in a plane, an uneven line; another, similarly shaped track on each of said teeth, being inverted with regard to said first mentioned track.

2. In a spur toothed wheel having a centre plane, teeth being asymmetric with regard to said centre plane and a track on each of said teeth, being of a curved shape varying according to a given ratio on travelling in a given sense along said teeth; another track on each of said teeth, having a shape varying according to substantially the same ratio on travelling in the opposite sense along said teeth.

3. In a spur toothed wheel having a pair of side planes, teeth and a track on each of said teeth forming, when developed in a plane, a greater angle with one of said side planes and a smaller angle with the other of said planes; another track on each of said teeth forming, when developed in a plane, a smaller angle with said first mentioned side plane and a greater angle with said second mentioned side plane.

4. In a spur toothed wheel having a centre plane, a plurality of teeth having curved tracks and being longitudinally of variable thickness, the greater thickness being at one side and the smaller thickness at the other side of said centre plane.

5. In a spur toothed wheel having a centre plane, a pitch surface, a plurality of uneven teeth having a mean thickness, and a curved track on each of said teeth; another track on each of said teeth, being congruous with a line which is symmetrical, with regard to said centre plane, to said first mentioned track, but displaced parallel to itself along said pitch surface by said mean thickness of teeth.

6. In a spur toothed wheel having a centre plane, a plurality of uneven teeth and a track on each of said teeth; another track on each of said teeth, being congruous with a line which is symmetrical, with regard to the said centre plane, to said first mentioned track and bent on its side end portions towards the said first mentioned track.

7. In a spur toothed wheel having a centre plane, a plurality of teeth being asymmetrical with regard to said centre plane and a track on each of said teeth being, when developed in a plane, an uneven line; another track on each of said teeth, being congruous with a line which is substantially specular to (a mirror image of) said first mentioned track.

8. In a spur toothed wheel having a centre plane, teeth being longitudinally asymmetrical with regard to said centre plane and a side face on each of said teeth, having a given longitudinal curvature on the left side of said centre plane and another curvature on the right side of said centre plane; another side face on each of said teeth, having a longitudinal curvature similar to said first mentioned curvature on the right side of said centre plane and a curvature similar to said second mentioned curvature on the left side of said centre plane.

9. In a spur toothed wheel having a centre plane, teeth being longitudinally asymmetrical with regard to said centre plane and a side face on each of said teeth, having a longitudinal curvature varying along the said face, the greater curvature being at the one side of said centre plane; another side face on each of said teeth, having a longitudinal curvature varying along the said second mentioned side face, the greater curvature being at the other side of said centre plane.

10. In a spur toothed wheel having a pitch surface, longitudinally curved teeth and a track on each of said teeth, being an arc of a right hand periodical curve enveloped on said pitch surface; another track on each of said teeth, being an arc of a left hand periodical curve enveloped on said pitch surface.

11. In a spur toothed wheel having a centre plane, a pitch surface, longitudinally curved teeth, an inner track on each of said teeth, being an arc of prolate cycloid enveloped on said pitch surface, the rolling circle generating said track lying substantially at one side of the said centre plane; an outer track on each of said teeth, being an arc of prolate cycloid enveloped on said pitch surface, the rolling circle generating said outer track lying substantially at the other side of said centre plane.

12. In a spur toothed wheel having a centre plane, longitudinally curved teeth, a convex track on said teeth, being generated by a beam and a rolling circle lying substantially at one side of said centre plane; a concave track on said teeth, being generated by another beam, greater than the first mentioned beam, and another rolling circle lying substantially at the other side of said centre plane.

13. In a set spur toothed wheel having a centre plane and teeth being asymmetrical with regard to said centre plane; and having tooth faces being longitudinally of whatever uneven shape, said tooth faces being conjugated with any other tooth face of a gear of the said set, so that the said toothed wheel is interchangeable with every other of the said set, and even with an equal one.

14. In a toothed wheel having a plurality of indentations, a corresponding centre plane for each of said indentations, teeth on each of said indentations, a tooth face on each of said teeth, being asymmetrical with regard to said corresponding centre plane and a track on each of said tooth faces of each of said indentations, said track being, when developed in a plane, an uneven line; another tooth face on each of said teeth, being asymmetrical with regard to said corresponding centre plane and another track on each of said second mentioned tooth faces, being, when developed in a plane, an uneven line similar to, but inverted with respect to said first mentioned track.

15. In a toothed wheel as claimed in claim 14, flexible means adapted to operatively connect said indentations with one another.

16. In a spur toothed wheel having a centre plane, teeth being asymmetric with regard to said centre plane and a track on each of said teeth being, when developed in a plane, an uneven line and of a shape varying according to a given ratio on travelling in a given sense along said teeth, another track on each of said teeth being, when developed in a plane, an uneven line and of a shape varying according to substantially the same ratio on travelling in the opposite sense along said teeth.

17. In a spur toothed wheel having a centre plane, teeth being asymmetric with regard to said centre plane and a track on each of said teeth, being of an angular shape varying according to a given ratio on travelling in a given sense along said teeth, another track on each of said teeth, having a shape varying according to substantially the same ratio on travelling in the opposite sense along said teeth.

18. In a spur toothed wheel having a centre plane, teeth being asymmetric with regard to said centre plane and a track on each of said teeth, being of a partially curved and partially angular shape varying according to a given ratio on travelling in a given sense along said teeth, another track on each of said teeth, having a shape varying according to substantially the same ratio on travelling in the opposite sense along said teeth.

19. In a spur toothed wheel having a centre plane, a pitch surface, a plurality of uneven teeth having a mean thickness, and an angular track on each of said teeth, another track on each of said teeth, being congruous with a line which is symmetrical, with regard to said centre plane, to said first mentioned track, but displaced parallel to itself along said pitch surface by said mean thickness of teeth.

20. In a spur toothed wheel having a centre plane, a pitch surface, a plurality of uneven teeth having a mean thickness, and a partially curved and partially angular track on each of said teeth, another track on each of said teeth, being congruous with a line which is symmetrical, with regard to said centre plane, to said first mentioned track, but displaced parallel to itself along said pitch surface by said mean thickness of teeth.

21. In a spur toothed wheel having a centre plane, a pitch surface, a plurality of uneven teeth having a mean thickness and a track on each of said teeth, being, when developed in a plane, an uneven line, another track on each of said teeth, being congruous with a line which is symmetrical with regard to said centre plane, to said first mentioned track, but displaced parallel to itself along said pitch surface by said mean thickness of teeth.

ALBERT FORSTER.